United States Patent
Jiang

(10) Patent No.: US 7,733,826 B2
(45) Date of Patent: Jun. 8, 2010

(54) METHOD AND RELATED APPARATUS OF DEFAULT TIMER CONFIGURATIONS OF WIRELESS COMMUNICATIONS SYSTEM

(75) Inventor: Sam Shiaw-Shiang Jiang, Taipei (TW)

(73) Assignee: Innovative Sonic Limited, Tortola (VG)

( * ) Notice: Subject to any disclaimer, the term of this patent is extended or adjusted under 35 U.S.C. 154(b) by 503 days.

(21) Appl. No.: 11/797,478

(22) Filed: May 3, 2007

(65) Prior Publication Data

US 2007/0258400 A1 Nov. 8, 2007

Related U.S. Application Data

(60) Provisional application No. 60/746,650, filed on May 7, 2006.

(51) Int. Cl.
*H04W 4/00* (2009.01)
(52) U.S. Cl. .................................................. 370/328
(58) Field of Classification Search ........................ None
See application file for complete search history.

(56) References Cited

FOREIGN PATENT DOCUMENTS

| EP | 1 389 886 A1 | 2/2004 |
|---|---|---|
| EP | 1 465 369 A1 | 10/2004 |
| KR | 1020040015672 | 2/2004 |

OTHER PUBLICATIONS

Xu et al, Simulation Analysis of RLC Timers in UMTS System, IEEE, 7 pages, 2002.*
3GPP TS 25.331 V6.9.0 (Mar. 2006) "Radio Resource Control (RRC) protocol specification".
3GPP TS, 34.108 V6.2.0 (Mar. 2006), "Common test environments for User Equipment (UE); Conformance testing".
3GPP TS 25.331 V5.12.0 (Mar. 2005), 3rd Generation Partnership Project; Technical Specification Group Radio Access Network; Radio Resource Control (RRC); Protocol Specification (Release 5), P481/490, Mar. 2005.
3GPP TS 25.322 V4.5.0 (Jun. 2002), "Radio Link Control (RLC) protocol specification"pp. 44-46.
3GPP TSG-RAN WG2 meeting #45bis, R2-050095, (Jan. 10, 2005) "Qualcomm, RLC Status Reporting Enhancement" pp. 1-15.
Juan J. Alcaraz, Fernando Cerdan, and Joan Garcia-Haro, "Optimizing TCP and RLC Interaction in the UMTS Radio Access Network", Mar. 20, 2006, IEEE Network, IEEE.
3GPP TSGR#2(99)147 (Mar. 1999), "TSG RAN WG2, S2.22 RLC protocol specification" pp. 21-22.

* cited by examiner

*Primary Examiner*—Frank Duong
(74) *Attorney, Agent, or Firm*—Winston Hsu

(57) ABSTRACT

A method for setting default values of timers in a wireless communications system includes setting default values of timers Timer_RST and Timer_Poll to be a first value. The timers Timer_RST and Timer_Poll are used to respectively hold retransmission of a reset signaling packet and a polling until an expected response is received.

10 Claims, 3 Drawing Sheets

METHOD AND RELATED APPARATUS OF DEFAULT TIMER CONFIGURATIONS OF WIRELESS COMMUNICATIONS SYSTEM

CROSS REFERENCE TO RELATED APPLICATIONS

This application claims the benefit of U.S. Provisional Application No. 60/746,650, filed on May 7, 2006 and entitled "Method and Apparatus of Default Radio Configurations," the contents of which are incorporated herein by reference.

BACKGROUND OF THE INVENTION

1. Field of the Invention

The present invention relates to a method and related apparatus of default timer configurations of wireless communications system, and more particularly to a method and related apparatus for decreasing delay of a reset procedure.

2. Description of the Prior Art

The third generation (3G) mobile communications system has adopted a Wideband Code Division Multiple Access (WCDMA) wireless air interface access method for a cellular network. WCDMA can provide high frequency spectrum utilization, universal coverage, and high quality, high speed multimedia data transmission. The WCDMA method also meets all kinds of QoS requirements simultaneously, providing diverse flexible two-way transmission services and better communication quality to reduce transmission interruption rates. Taking Universal Mobile Telecommunications System (UMTS) as an example, the 3G mobile communications system is composed of User Equipment (UE), UMTS Terrestrial Radio Access Network (UTRAN), and Core Network (CN), using communications protocols of Access Stratum (AS) and Non-Access Stratum (NAS). Targeting the AS, the 3G mobile communications system defines various protocol stacks, such as Radio Resource Control (RRC), Radio Link Control (RLC), Media Access Control (MAC), Packet Data Convergence Protocol (PDCP), and Broadcast/Multicast Control (BMC).

To implement functions of the aforementioned protocol stacks, the 3rd Generation Partnership Project (3GPP) has established related communication protocol specifications as its website, www.3gpp.org, presents. The communication protocol specifications provide default configurations for variables and parameters, so as to enhance system efficiency, and to reduce the signaling messages during radio connection setup for a UE. However, some default configurations may affect system operations, causing waste of radio resources. For example, in a communications protocol specification established by the 3GPP(3GPPTS 25.331 V6.9.0 (2006-03), "Radio Resource Control (RRC) protocol specification"), the default value of a timer Timer_RST in the uplink configuration is set to be 300 ms (millisecond), a timer Timer_Poll in the uplink configuration is not configured by default, and the default value of a timer Timer_Status_Prohibit in the downlink configuration is set to be 100 ms. However, in another communications protocol specification established by the 3GPP (3GPP TS 34.108 V6.2.0 (2006-03), "Common test environments for User Equipment (UE); Conformance testing"), the default values of the timers Timer_RST and Timer_Poll in the uplink configuration are set to be 500 ms and 200 ms respectively, and the default value of the timer Timer_Status_Prohibit in the downlink configuration is set to be 200 ms.

The timers Timer_RST, Timer_Status$_{13}$ Prohibit, and Timer_Poll are all used for RLC entities (of UE or/and UTRAN) to hold retransmission of a control signaling (RESET PDU, STATUS report, or polling) until the expected response from the peer RLC entity is received. Note that, descriptions of the three timers can be found in the RLC communications protocol specification established by the 3GPP, and will not be narrated in detail. Thus, all the three timers should be equal to or longer than the round trip time (RTT), which is the time duration between the instant when the signaling is sent out and the instant when the response message is received. To cover variance of processing powers among different UE implementations, the timers are generally configured to be larger than RTT.

In the specifications 3GPPTS 25.331 V6.9.0 and 3GPPTS 34.108 V6.2.0, the default values of the timers are different, and the default value of the same timer is inconsistent, causing system efficiency degradation.

For example, in 3GPP TS 25.331 V6.9.0, the timer Timer_Status_Prohibit is set to be 100 ms, meaning that RTT is shorter than 100 ms, but the timer Timer_RST is set to be 300 ms. Thus, a RESET PDU will be held for 300 ms before it can be retransmitted if a RESET ACK PDU corresponding to the RESET PDU is not received by the sender. However, since RTT is shorter than 100 ms, if the RESET ACK PDU is not received within 100 ms, the RESET ACK PDU will never arrive later. Thus, retransmission of the RESET PDU is delayed 200 ms (300−100=200) longer than needed. The reset procedure is delayed.

Similarly, in 3GPP TS 34.108 V6.2.0, the timers Timer_Status_Prohibit, and Timer_Poll are all set to be 200 ms, meaning that RTT is less than 200 ms. However, the timer Timer_RST is set to be 500 ms. Thus, retransmission of the RESET PDU is delayed 300 ms (500−200=300) longer than needed. The reset procedure is also delayed.

SUMMARY OF THE INVENTION

According to the present invention, a method for setting default values of timers in a wireless communications system comprises setting default values of timers Timer_RST and Timer_Poll to be a first value, wherein timers Timer_RST and Timer_Poll are used to respectively hold retransmission of a reset signaling packet and a polling until an expected response is received.

According to the present invention, a communications device utilized in a wireless communications system for accurately setting default values of timers comprises a control circuit for realizing functions of the communications device, a processor installed in the control circuit for executing a program code to operate the control circuit, and a memory coupled to the processor for storing the program code. The program code comprises setting default values of timers Timer_RST and Timer_Poll to be a first value, wherein timers Timer-RST and Timer_Poll are used to respectively hold retransmission of a reset signaling packet and a polling until an expected response is received.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
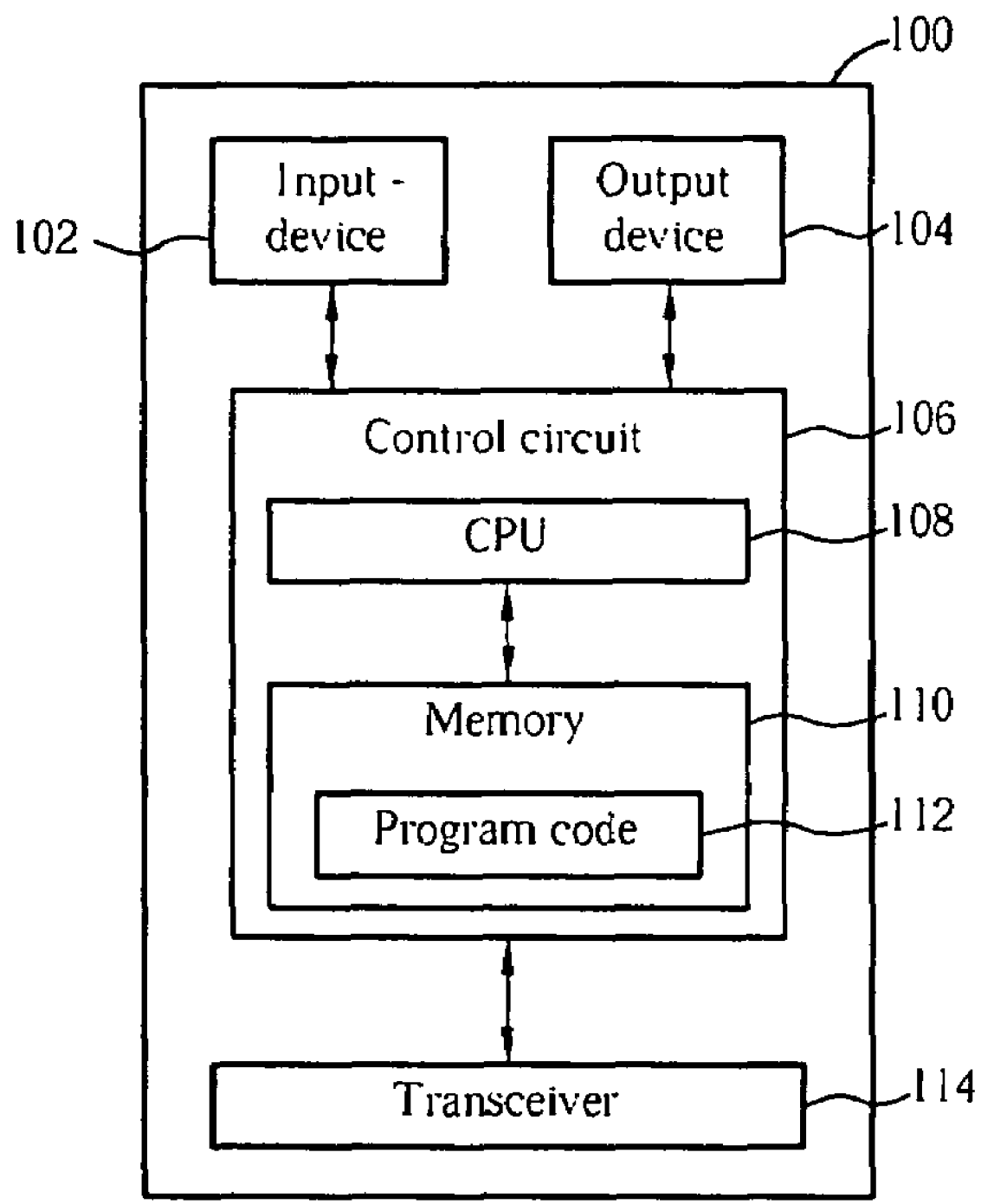
FIG. 1 is a function block diagram of a wireless communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 2:
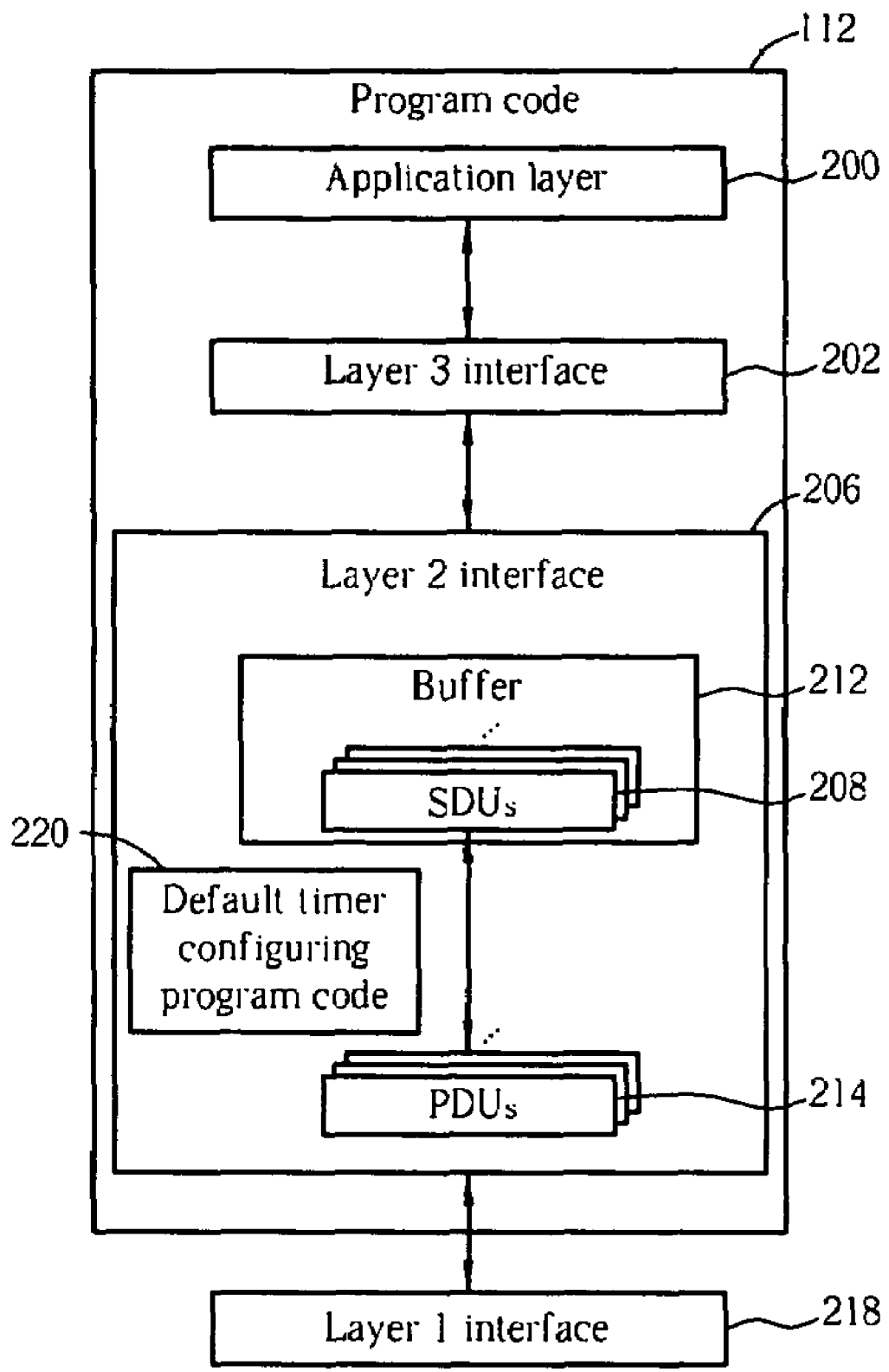
FIG. 2 is a diagram of program code of FIG. 1.

Please continue to refer to FIG. 2. FIG. 2 is a diagram of the program code 112 shown in FIG. 1. The program code 112 comprises an application layer 200, a Layer 3 interface 202, and a Layer 2 interface 206, and is coupled to a Layer 1 interface 218. When a signal is transmitted, the Layer 2 interface 206 forms a plurality of SDUs 208 according to data submitted by the Layer 3 interface 202, and stores the plurality of SDUs 208 in a buffer 212. Then, based on the SDUs 208 stored in the buffer 212, the Layer 2 interface 206 generates a plurality of PDUs 214, and sends the plurality of PDUs 214 to a destination terminal through the Layer 1 interface 218. In contrast, when a wireless signal is received, the signal is received through the Layer 1 interface 218, then delivered as PDUs 214 to the Layer 2 interface 206. The Layer 2 interface 206 restores the PDUs 214 to SDUs 208 and stores the SDUs 208 in the buffer 212. Last, the Layer 2 interface 206 delivers the SDUs 208 stored in the buffer 212 to the Layer 3 interface 202.

Preferably, operations of the communications device 100 conform to the communications protocol established by the 3GPP. Directed at default configurations of timers, the embodiment of the present invention can set default values of timers Timer_Poll and Timer_RST based on a default timer configuring program code 220, so as to timely trigger a reset procedure, to enhance transmission efficiency, and to utilize system resources efficiently.

Figure 3:
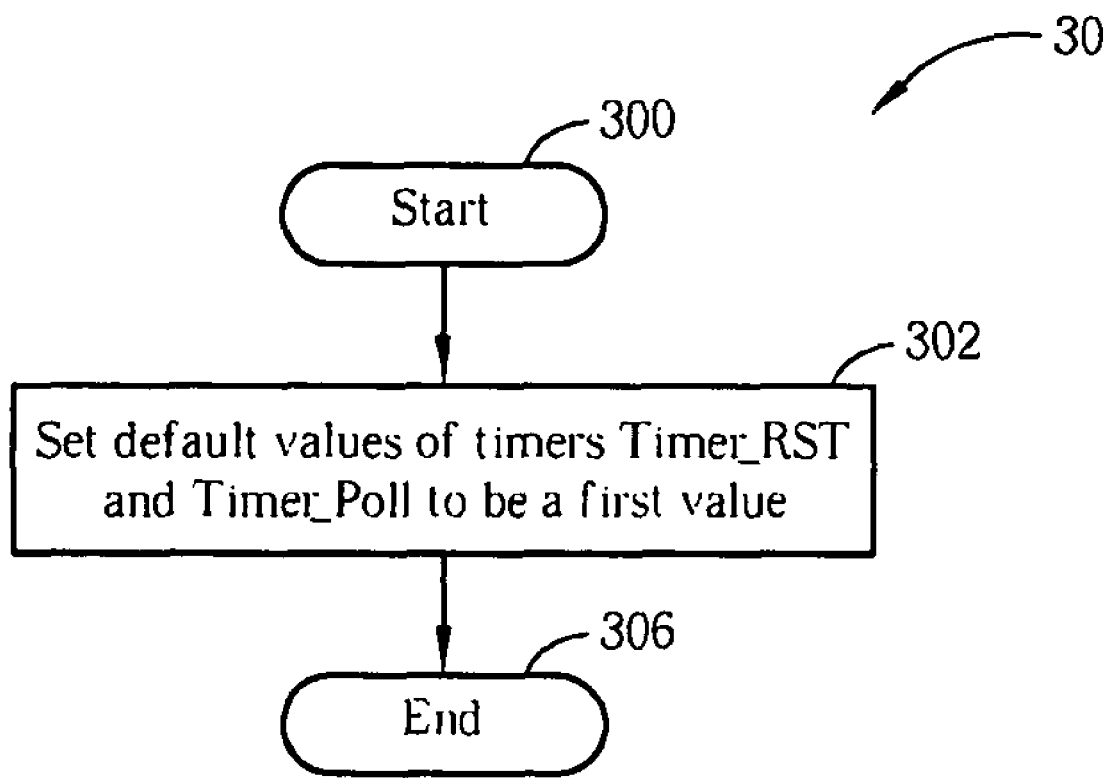
FIG. 3 is a flowchart of a process according to the embodiment of the present invention.

Please refer to FIG. 3, which illustrates a flowchart diagram of a process 30 according to the embodiment of the present invention. The process 30 is utilized for setting default values of timers in a wireless communications system, and can be complied into the default timer configuring program code 220. The process 30 comprises steps of:

Step 300: Start.
Step 302: Set default values of timers Timer_RST and Timer_Poll to be a first value.
Step 306: End.

According to the process 30, the embodiment of the present invention sets the default values of the timers Timer_RST and Timer_Poll to be the first value. Preferably, the first value is equal to or greater than RTT. Furthermore, it is preferred that besides default values, configured values of the timers Timer_RST and Timer_Poll are set to be a second value. Preferably, the second value is equal to the first value.

For example, suppose that the first value is set to be a little larger than RTT (e.g. 200 ms or 100 ms). According to the definition of the timer Timer_RST, retransmission of a RESET PDU is triggered by a sender if a RESET ACK PDU corresponding to the RESET PDU is not received by the sender before the timer Timer_RST expires. Since the default value of the timer Timer_RST is a little greater than RTT, the sender can timely retransmit the RESET PDU to trigger the reset procedure. Similar situation happens for polling.

Therefore, using the process 30, the sender can timely retransmit the RESET PDU and poll.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for setting default values of timers in a wireless communications system comprising:
   using a processor of a communications device of the wireless communications system for setting default values of timers Timer_RST and Timer_Poll to be a first value, so that the default value of the timer Timer_RST is equal to the default value of the timer Timer_Poll;
   wherein the timers Timer_RST and Timer_Poll are used to respectively hold retransmission of a reset signaling packet and a polling until an expected response is received; and the first value is a finite value and is equal to or greater than Round Trip Time (RTT).

2. The method of claim 1, wherein the first value is 200 milliseconds (ms).

3. The method of claim 1, wherein the first value is 100 ms.

4. The method of claim 1 further comprising:
   configuring values of the timers Timer_RST and Timer_Poll to be a second value.

5. The method of claim 4, wherein the first value and the second value are equal.

6. A communications device utilized in a wireless communications system for accurately setting default values of timers comprising:
   a control circuit for realizing functions of the communications device;
   a processor installed in the control circuit for executing a program code to operate the control circuit; and
   a memory coupled to the processor for storing the program code;
   wherein the program code comprises:
      setting default values of timers Timer_RST and Timer_Poll to be a first value, so that the default value of the timer Timer_RST is equal to the default value of the timer Timer_Poll;
      wherein the timers Timer_RST and Timer_Poll are used to respectively hold retransmission of a reset signaling packet and a polling until an expected response is received; and the first value is a finite value and is equal to or greater than Round Trip Time (RTT).

7. The communications device of claim 6, wherein the first value is 200 milliseconds (ms).

8. The communications device of claim 6, wherein the first value is 100 ms.

9. The communications device of claim 6, wherein the program code further comprises:
   configuring values of the timers Timer_RST and Timer_Poll to be a second value.

10. The communications device of claim 9, wherein the first value and the second value are equal.

* * * * *